United States Patent
Chakravarti et al.

[11] Patent Number: 6,165,433
[45] Date of Patent: Dec. 26, 2000

[54] CARBON DIOXIDE RECOVERY WITH COMPOSITE AMINE BLENDS

[75] Inventors: Shrikar Chakravarti, Williamsville; Amitabh Gupta, East Amherst, both of N.Y.

[73] Assignee: Praxair Technology, Inc., Danbury, Conn.

[21] Appl. No.: 09/329,259

[22] Filed: Jun. 10, 1999

[51] Int. Cl.[7] ................................................. C01B 31/20
[52] U.S. Cl. .......................................... 423/229; 423/228
[58] Field of Search .................................. 423/228, 229, 423/437.1

[56] References Cited

U.S. PATENT DOCUMENTS

| | | | |
|---|---|---|---|
| 4,336,233 | 6/1982 | Appl et al. | 423/228 |
| 4,440,731 | 4/1984 | Pearce | 423/228 |
| 4,477,419 | 10/1984 | Pearce et al. | 423/228 |
| 4,624,839 | 11/1986 | Wolcott et al. | 423/228 |
| 5,378,442 | 1/1995 | Fujii et al. | 423/228 |
| 5,603,908 | 2/1997 | Yoshida et al. | 423/220 |
| 5,618,506 | 4/1997 | Suzuki et al. | 423/228 |

FOREIGN PATENT DOCUMENTS 331788  9/1989  European Pat. Off. .

OTHER PUBLICATIONS

Kohl, "Gas Purification", 5th Ed., pp. 40, 41, 48–57, 98 and 99 (1997).
Barchas, "Energy Convers. Mgmt.", vol. 33, No. 5–8, pp. 333–340 (1992).
Sander et al., "Energy Convers. Mgmt.", vol. 33, No. 5–8, pp. 341–348 (1992).

*Primary Examiner*—Steven P. Griffin
*Assistant Examiner*—Elin A Warn
*Attorney, Agent, or Firm*—Stanley Ktorides

[57] ABSTRACT

A method for recovering carbon dioxide by absorption of carbon dioxide from a gas stream into a composite recovery solvent comprising preferably a lesser concentration of one or more fast reaction rate amines and a greater concentration of one or more slow reaction rate amines.

9 Claims, 1 Drawing Sheet

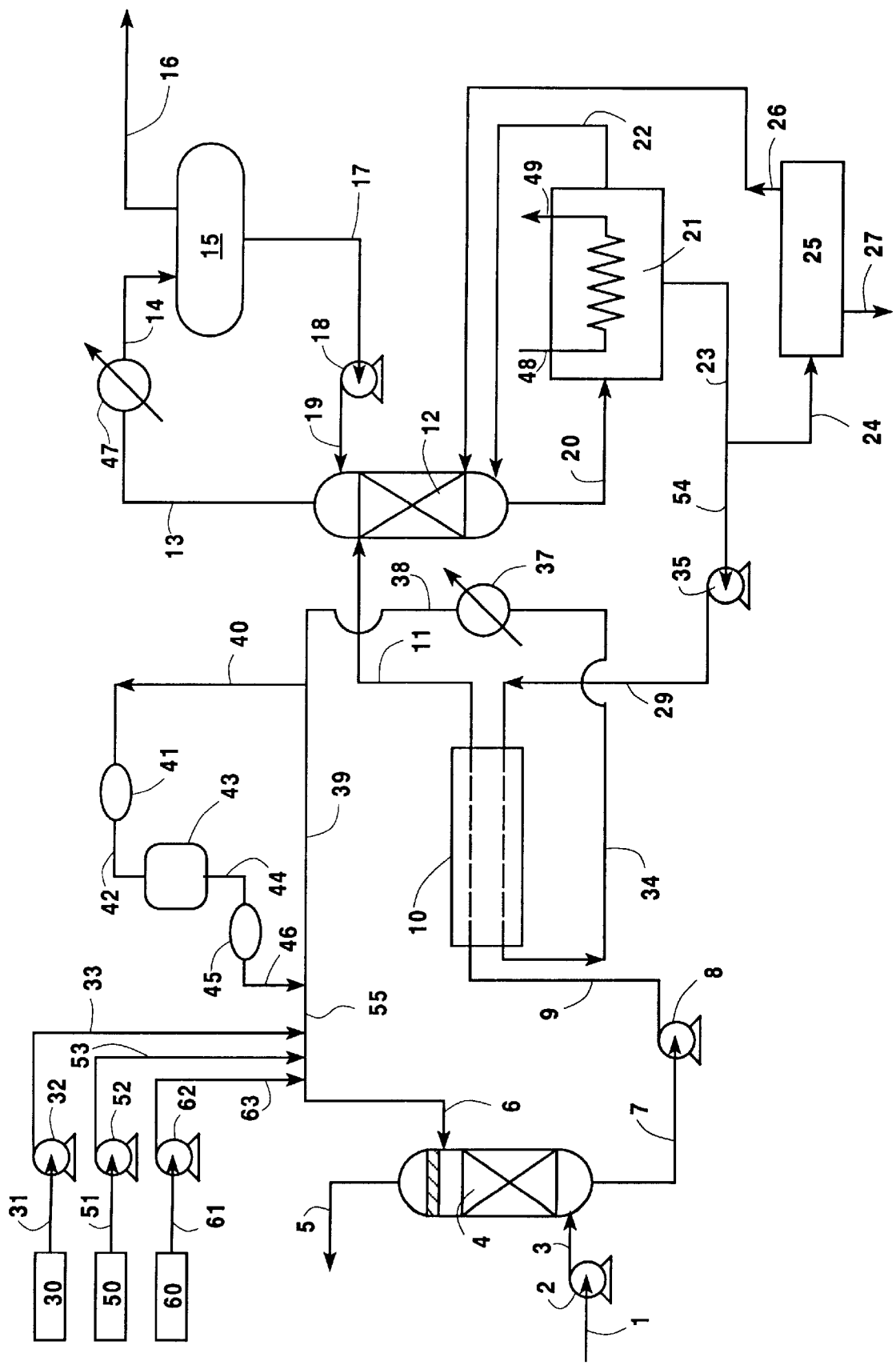

CARBON DIOXIDE RECOVERY WITH COMPOSITE AMINE BLENDS

TECHNICAL FIELD

This invention relates generally to the recovery of carbon dioxide and, more particularly, to the recovery of carbon dioxide from a gas by absorption into an amine based recovery solvent.

BACKGROUND ART

One important method for recovering carbon dioxide is the absorption of the carbon dioxide from lean carbon dioxide sources, such as flue gases from combustion sources, from the gas stream into an amine recovery solvent and the subsequent separation and recovery of the carbon dioxide from the recovery solvent.

Two different amine based carbon dioxide recovery systems are known and practiced commercially for the absorption of carbon dioxide from lean sources at or slightly above atmospheric pressure. In one such system a relatively high concentration of amine is used in the recovery solvent. However, because a high concentration of amine in the recovery solvent causes corrosion problems in the downstream processing, the recovery solvent must contain effective levels of inhibitors. This increases both the cost and the complexity of the carbon dioxide recovery.

In another amine based carbon dioxide recovery system, a relatively low amine concentration is used in the recovery solvent. This system avoids the costly and complicated need to use inhibitors in the recovery solvent but at the expense of larger equipment and higher energy requirements. There is a clear need for an amine based carbon dioxide recovery system which enables a high rate of carbon dioxide recovery with lower capital and operating costs while avoiding the need to employ inhibitors in the recovery solvent.

Amine blends have been used before for the absorption of carbon dioxide from gases containing several other gas species. However, in these instances, the feed gas is typically at a pressure in excess of 100 pounds per square inch absolute (psia) with a carbon dioxide partial pressure greater than 25 psia. Examples of such gases include natural gas, coke-oven gas, refinery gas and synthesis gas. Typically such amine blends employ a tertiary alkanolamine such as methyldiethanolamine in a high concentration as the main component and also employ a small amount of a rate promoting agent such as monoethanolamine, diethanolamine or piperazine. The present invention is directed to carbon dioxide recovery from feed gases at a pressure of about 14.7 to 30 psia and having a carbon dioxide partial pressure typically within the range of from 0.3 to 10 psia. The amine blends useful for absorption at high pressure do not work well for low pressure systems.

Accordingly it is an object of this invention to provide an improved amine based carbon dioxide recovery system which enables high recovery of carbon dioxide from a low pressure system.

SUMMARY OF THE INVENTION

The above and other objects, which will become apparent to those skilled in the art upon a reading of this disclosure, are attained by the present invention, one aspect of which is:

A method for recovering carbon dioxide comprising:
 (A) passing feed gas comprising carbon dioxide at a partial pressure of 10 psia or less in mass transfer contact with recovery solvent comprising water, from 5 to 35 weight percent of at least one fast reaction rate amine, and from 5 to 50 weight percent of at least one slow reaction rate amine;
 (B) passing carbon dioxide from the feed gas to the recovery solvent to produce carbon dioxide depleted gas and carbon dioxide loaded recovery solvent;
 (C) separating carbon dioxide from the carbon dioxide loaded recovery solvent to produce carbon dioxide rich fluid; and
 (D) recovering carbon dioxide rich fluid as product carbon dioxide.

Another aspect of the invention is:

A method for recovering carbon dioxide comprising:
 (A) passing feed gas comprising carbon dioxide at a partial pressure of 10 psia or less in mass transfer contact with recovery solvent comprising water and at least two different fast reaction rate amines with no slow reaction rate amine present in the recovery solvent;
 (B) passing carbon dioxide from the feed gas to the recovery solvent to produce carbon dioxide depleted gas and carbon dioxide loaded recovery solvent;
 (C) separating carbon dioxide from the carbon dioxide loaded recovery solvent to produce carbon dioxide rich fluid; and
 (D) recovering carbon dioxide rich fluid as product carbon dioxide.

As used herein, the term "absorption column" means a mass transfer device that enables a suitable solvent to selectively absorb absorbate from a blend containing one or more other components.

As used herein, the term "stripping column" means a mass transfer device where a component such as absorbate is separated from absorbent, generally through the application of energy.

As used herein, the terms "upper portion" and "lower portion" mean those sections of a column respectively above and below the mid point of the column.

As used herein, the term "indirect heat exchange" means the bringing of two fluids into heat exchange relation without any physical contact or intermixing of the fluids with each other.

As used herein, the term "inhibitor" means a chemical or mixture of chemicals that inhibits or reduces the rate of a reaction. For example, copper carbonate in combination with one or more of dihydroethylglycine, alkali metal permanganate, alkali metal thiocyanate, nickel or bismuth oxides with or without alkali metal carbonate inhibits oxidative degradation of amines.

As used herein, the term "fast reaction rate amine" means an amine which can absorb more than 70 percent of the carbon dioxide from a gas stream at or slightly above atmospheric pressure and having a carbon dioxide concentration within the range of from 3 to 25 mole percent, in an absorption column having less than 50 stages.

As used herein, the term "slow reaction rate amine" means an amine capable of absorbing carbon dioxide but which is not a fast reaction rate amine.

BRIEF DESCRIPTION OF THE DRAWING

The sole FIGURE is a schematic representation of one preferred embodiment of the invention wherein the recovery solvent comprises both fast reaction rate amine and slow reaction rate amine.

DETAILED DESCRIPTION

In the practice of this invention a composite recovery solvent is employed to absorb carbon dioxide from a low pressure gas stream. In one aspect of the invention the composite recovery solvent is a blend of two or more amines which have significantly different reaction rates with respect to carbon dioxide. The components of the composite blend work synergistically to effectively capture and recover carbon dioxide without significant degradation and without the need for inhibitors in the recovery solvent. The fast reacting amine, which if used at high concentrations could potentially cause corrosion problems without inhibitors, is used in a relatively low concentration in the recovery solvent, but at a concentration which enables the initiation of rapid carbon dioxide removal from the gas stream. The slower reacting amine, which by itself would be relatively ineffective in removing carbon dioxide from the low pressure gas stream unless a very long contact period were allowed, is present in the recovery solvent in a sufficient concentration to sustain the carbon dioxide removal from the gas stream at an acceptable rate once the initial rapid carbon dioxide removal commences due to the presence of the fast reacting amine. Together the two different amines of the composite blend enable effective removal of carbon dioxide from a gas stream over an acceptable time period without downstream degradation and without the need for costly and complicating inhibitors. The composite blends useful in the practice of this invention enable the use of recovery solvent with a high total amine concentration thus leading to reduced capital and operating costs.

In another aspect of the invention the recovery solvent comprises two different fast reaction rate amines without the presence of any slow reaction rate amines. The use of two different fast reaction rate amines enables acceptable performance without significant corrosion potential enabling one to dispense with the use of a slow reaction rate amine.

The invention will be described in greater detail with reference to the Drawing. Referring now to the FIGURE, feed gas 1, which typically has been cooled and treated for the reduction of particulates and other impurities such as sulfur oxides (SOx) and nitrogen oxides (NOx), is passed to compressor or blower 2 wherein it is compressed to a pressure generally within the range of from 14.7 to 30 psia. Feed gas 1 generally contains from 2 to 30 mole percent and, more typically from 3 to 20 mole percent, carbon dioxide and at a partial pressure less than 10 psia. Feed gas 1 may also contain oxygen in a concentration generally within the range of from 1 to 18 mole percent. Other species which may be present in feed gas 1 include nitrogen, trace hydrocarbons, carbon monoxide, water vapor, sulfur oxides, nitrogen oxides and particulates.

Compressed lean feed gas 3 is passed from blower 2 into the lower portion of absorption column 4 which is operating at a temperature generally within the range of from 40 to 45° C. at the top of the column and at a temperature generally within the range of from 50 to 60° C. at the bottom of the column. Recovery solvent 6 is passed into the upper portion of absorption column 4.

Recovery solvent 6 comprises from 5 to 35 weight percent of one or more fast reaction rate amines and from 5 to 50 weight percent of one or more slow reaction rate amines. Examples of fast reaction rate amines which may be used in the practice of this invention include monoethanolamine, diethanolamine, piperazine and dissopropanolamine. Preferred fast reaction rate amines for use in the recovery solvent in the practice of this invention are monoethanolamine, preferably in a concentration of from 10 to 20 weight percent, most preferably in a concentration of from 12 to 15 weight percent, and diethanolamine, preferably in a concentration of from 15 to 35 weight percent, most preferably in a concentration of from 20 to 30 weight percent. Examples of slow reaction rate amines which may be used in the recovery solvent in the practice of this invention include methyldiethanolamine, triethanolamine and sterically hindered amines such as 2-amino,2-methyl,1-propanol. The preferred slow reaction rate amine for use in the recovery solvent in the practice of this invention is methyldiethanolamine.

One preferred recovery solvent for use in the practice of this invention comprises from 10 to 20 weight percent monoethanolamine, preferably from 12–15 weight percent monoethanolamine, and from 20 to 40 weight percent methyldiethanolamine, preferably from 25 to 35 weight percent methyldiethanolamine. Another preferred recovery solvent for use in the practice of this invention comprises from 15 to 35 weight percent, preferably from 20 to 30 weight percent diethanolamine, and from 15 to 40 weight percent, preferably from 20 to 35 weight percent methyldiethanolamine.

The total amine concentration in the recovery solvent in the practice of this invention, whether or not a slow reaction rate amine is present, is generally within the range of from 20 to 80 weight percent, preferably within the range of from 30 to 50 weight percent. In addition to water, the recovery solvent may also contain other species such as diamines and triamines.

Within absorption column 4 the feed gas rises in countercurrent flow against downflowing recovery solvent. Absorption column 4 contains column internals or mass transfer elements such as trays or random or structured packing. As the feed gas rises, carbon dioxide within the feed gas is absorbed into the downflowing recovery solvent resulting in carbon dioxide depleted top vapor at the top of column 4, and into carbon dioxide loaded recovery solvent at the bottom of column 4. The top vapor is withdrawn from the upper portion of column 4 in gas stream 5 and the carbon dioxide loaded recovery solvent is withdrawn from the lower portion of column 4 in stream 7, passed to liquid pump 8 and from there to and through heat exchanger 10 wherein it is heated by indirect heat exchange to a temperature generally within the range of from 90 to 120° C., preferably from 100 to 110° C.

If feed gas 1 contains significant levels of oxygen which would then be absorbed into the recovery solvent as a consequence of the countercurrent mass transfer contact within absorption column 4, it is preferred that the recovery solvent be deoxygenated prior to the separation of carbon dioxide from the recovery solvent. Oxygen in the recovery solvent could also arise through other sources such as leaks in equipment or dissolved oxygen in makeup amine or water. In this case also it is preferred that the recovery solvent be deoxygenated prior to the separation of carbon dioxide from the recovery solvent. The deoxygenation can occur prior to or subsequent to the heating in heat exchanger 10. In a particularly preferred practice the heating which occurs in heat exchanger 10 is divided into two steps with the deoxygenation carried out between these two heating steps. Any effective deoxygenation practice may be used in conjunction with this invention. One preferred deoxygenation method involves depressurization of the recovery solvent for the release and removal of the dissolved oxygen. Another preferred deoxygenation method involves the passage of the recovery solvent through a stripping column against upflowing oxygen scavenger gas. A preferred source of oxygen scavenger gas is a small split stream of product stream 16.

Referring back now to the FIGURE, the heated carbon dioxide loaded recovery solvent is passed from heat exchanger 10 in stream 11 into the upper portion of stripping column 12 which is operating at a temperature typically within the range of from 100 to 110° C. at the top of the column and at a temperature typically within the range of from 119 to 125° C. at the bottom of the column. As the recovery solvent flows down through stripping column 12 over mass transfer elements which can be trays or random or structured packing, carbon dioxide within the recovery solvent is stripped from the amine solution of the recovery solvent into upflowing vapor, which is generally steam, to produce carbon dioxide rich top vapor and remaining amine recovery solvent. The carbon dioxide rich fluid is withdrawn from the upper portion of stripping column 12 in top vapor stream 13 and passed through reflux condenser 47 wherein it is partially condensed. Resulting two phase stream 14 is passed to reflux drum or phase separator 15 wherein it is separated into carbon dioxide gas and into condensate. The carbon dioxide gas is removed from phase separator 15 in stream 16 and recovered as carbon dioxide product fluid having a carbon dioxide concentration generally within the range of from 95 to 99.9 mole percent. By "recovered" as used herein it is meant recovered as ultimate product or separated for any reason such as disposal, further use, further processing or sequestration. The condensate, which comprises primarily water and amines, is withdrawn from phase separator 15 in stream 17, passed through liquid pump 18 and as stream 19 into the upper portion of stripping column 12.

Remaining amine recovery solvent which also contains water is withdrawn from the lower portion of stripping column 12 in stream 20 and passed to reboiler 21 wherein it is heated by indirect heat exchange to a temperature typically within the range of from 119 to 125° C. In the embodiment of the invention illustrated in the FIGURE, reboiler 21 is driven by saturated steam 48 at a pressure of 28 pounds per square inch gauge (psig) or higher, which is withdrawn from reboiler 21 in stream 49. The heating of the amine recovery solvent in reboiler 21 drives off the water which is passed as steam in stream 22 from reboiler 21 into the lower portion of stripping column 12 wherein it serves as the aforesaid upflowing vapor. The resulting amine recovery solvent is withdrawn from reboiler 21 in liquid stream 23. A portion 24 of stream 23 is fed to reclaimer 25 where this liquid is vaporized. Addition of soda ash or caustic soda to the reclaimer facilitates precipitation of any degradation byproducts and heat stable amine salts. Stream 27 depicts the disposal of any degradation byproducts and heat stable amine salts. The vaporized amine solution 26 can be reintroduced into the stripper as shown in the FIGURE. It can also be cooled and directly mixed with stream 6 entering the top of the absorber 4. Also, instead of the reclaimer 25 shown in the FIGURE, other purification methods such as ion-exchange or electrodialysis could be employed.

The remaining portion 54 of heated amine recovery solvent 23 is passed to solvent pump 35 and from there in stream 29 to and through heat exchanger 10 wherein it serves to carry out the aforesaid heating of the carbon dioxide loaded recovery solvent, and from which it emerges as cooled amine recovery solvent 34.

Stream 34 is cooled by passage through cooler 37 to a temperature of about 40° C. to form cooled recovery solvent 38. A portion 40 of stream 38 is passed through mechanical filter 41, from there as stream 42 through carbon bed filter 43, and from there as stream 44 through mechanical filter 45 for the removal of impurities, solids, degradation byproducts and heat stable amine salts. Resulting purified stream 46 is recombined with stream 39 which is the remainder of stream 38 to form stream 55. Storage tank 30 contains additional fast reaction rate amine for makeup. Fast reaction rate amine is withdrawn from storage tank 30 in stream 31 and pumped by liquid pump 32 as stream 33 into stream 55. Storage tank 50 contains makeup water. Water is withdrawn from storage tank 50 in stream 51 and pumped by liquid pump 52 as stream 53 into stream 55. Storage tank 60 contains makeup slow reaction rate amine. Slow reaction rate amine is withdrawn from storage tank 60 in stream 61 and pumped by liquid pump 62 as stream 63 into stream 55. Streams 33, 53 and 63 are combined with stream 55 to form recovery solvent stream 6 for passage into the upper portion of absorber column 4 as was previously described.

Although the invention has been described in detail with reference to one particularly preferred embodiment, those skilled in the art will recognize that there are other embodiments of the invention within the spirit and the scope of the claims.

What is claimed is:

1. A method for recovering carbon dioxide comprising:
   (A) passing feed gas comprising carbon dioxide at a partial pressure of 10 psia or less in mass transfer contact with a recovery solvent comprising water, from 5 to 35 weight percent of at least one fast reaction rate amine, and from 5 to 50 weight percent of at least one slow reaction rate amine;
   (B) passing carbon dioxide from the feed gas to the recovery solvent to produce carbon dioxide depleted gas and carbon dioxide loaded recovery solvent;
   (C) separating carbon dioxide from the carbon dioxide loaded recovery solvent to produce carbon dioxide rich fluid; and
   (D) recovering carbon dioxide rich fluid as product carbon dioxide wherein the carbon dioxide loaded recovery solvent additionally contains dissolved oxygen, and further comprising deoxygenating the carbon dioxide loaded recovery solvent prior to the separation of step (C).

2. The method of claim 1 wherein the recovery solvent is substantially free of inhibitors.

3. The method of claim 1 wherein the recovery solvent comprises from 10 to 20 weight percent monoethanolamine.

4. The method of claim 1 wherein the recovery solvent comprises from 15 to 35 weight percent diethanolamine.

5. The method of claim 1 wherein the recovery solvent comprises from 10 to 20 weight percent monoethanolamine and from 20 to 40 weight percent methyldiethanolamine.

6. The method of claim 1 wherein the recovery solvent comprises from 12 to 15 weight percent monoethanolamine and from 25 to 35 weight percent methyldiethanolamine.

7. The method of claim 1 wherein the recovery solvent comprises from 15 to 35 weight percent diethanolamine and from 15 to 40 weight percent methyldiethanolamine.

8. The method of claim 1 wherein the recovery solvent comprises from 20 to 30 weight percent diethanolamine and from 20 to 35 weight percent methyldiethanolamine.

9. A method for recovering carbon dioxide comprising:
   (A) passing feed gas comprising carbon dioxide at a partial pressure of 10 psia or less in mass transfer contact with a recovery solvent comprising water and at least two different fast reaction rate amines with no slow reaction rate amine present in the recovery solvent;
   (B) passing carbon dioxide from the feed gas to the recovery solvent to produce carbon dioxide depleted gas and carbon dioxide loaded recovery solvent;

(C) separating carbon dioxide from the carbon dioxide loaded recovery solvent to produce carbon dioxide rich fluid; and (D) recovering carbon dioxide rich fluid as product carbon dioxide wherein the carbon dioxide loaded recovery solvent additionally contains dissolved oxygen, and further comprising deoxygenating the carbon dioxide loaded recovery solvent prior to the separation of step (C).

* * * * *